United States Patent [19]

Kunstadt

[11] Patent Number: 5,003,598
[45] Date of Patent: Mar. 26, 1991

[54] SECURE COMMUNICATION SYSTEM

[76] Inventor: George H. Kunstadt, 4450 La Barca Dr., Tarzana, Calif. 91356

[21] Appl. No.: 302,661

[22] Filed: Jan. 23, 1989

[51] Int. Cl.[5] .................................................. H04L 9/02
[52] U.S. Cl. ........................................ 380/48; 380/44; 380/47; 379/62
[58] Field of Search ................... 380/6, 9, 21, 33, 34, 380/38, 39, 40, 47, 43, 46, 48; 379/58, 62, 63; 455/33

[56] References Cited

U.S. PATENT DOCUMENTS

| | | | |
|---|---|---|---|
| 4,171,513 | 10/1979 | Otey | 325/32 |
| 4,326,292 | 4/1982 | Spilker, Jr. et al. | 380/33 |
| 4,396,802 | 8/1983 | Hurst | 380/33 X |
| 4,411,017 | 10/1983 | Talbot | 380/33 |
| 4,560,832 | 12/1985 | Bond et al. | 380/33 |
| 4,659,878 | 4/1987 | Dinkins | 379/62 X |
| 4,727,568 | 2/1988 | Morishima | 379/58 |
| 4,811,377 | 3/1989 | Krolopp et al. | 379/58 X |
| 4,811,394 | 3/1989 | Ragavan et al. | 380/21 |
| 4,888,799 | 12/1989 | Mobley et al. | 380/38 X |

OTHER PUBLICATIONS

MacWilliam et al., Proceedings of the IEEE, vol. 64, No. 12, Dec. 1976, pp. 1715-1730.

Primary Examiner—Thomas H. Tarcza
Assistant Examiner—Tod Swann

[57] ABSTRACT

A secure communication system comprising signal manipulation and inverse signal manipulation means at the sending and receiving locations respectively, the signal manipulation processes being controlled by keying signals derived according to predetermined operations from another, unrelated signal, said signal being readily and reliably available at both sending and receiving locations.

5 Claims, 2 Drawing Sheets

SECURE COMMUNICATION SYSTEM

BACKGROUND OF THE INVENTION

This invention relates to communication systems in which the contents of the message needs to be protected from undesirable interception by other than the party it is intended for, in which case sender and receiver commonly desire to practice some form of message signal manipulation to protect the confidential nature of the message.

Although not necessarily restricted to any one application, this invention will be found usefu in the practice of cellular telephone systems. Such systems, using public airwaves at specific known radio frequencies are particularly prone to unauthorized interception. Futhermore, as sender or receiver may operate from a moving vehicle, the possibility of signal fading is ever present, and one cannot count on being able to receive a continuous, uninterrupted signal. Possible signal discontinuity makes it impossible to employ some of the most powerful signal manipulation or encryption means*. These means operate on message blocks of specific length, and if during transmission part of a block is lost, block framing is lost and decoding by the receiver is impossible. Therefore, current state-of-the-art in cellular telephone encryption systems resorts to such well known schemes as audio frequency transposition, inversion, or partition and rearrangement by bands of frequencies. More secure systems, which rely on block recognition or synchronization are not available.

*U.S. Department of Commerce. FIPS PUB 46-1: Data Encryption Standard. FIPS PUB 81; DES Modes of Operation.

SUMMARY OF THE INVENTION

The present invention is embodied in a secure communication system consisting of a message source of plain text, signal manipulation means, a transmission medium for the cipher text, inverse signal manipulation means and the ultimate receiver of the plain text. In accordance with the invention both the signal manipulation means and the inverse means operate under control of a synchronously occuring timing reference derived from any publicly available signal, which can be obtained at both the sending and receiving stations in a reliable, continous, low-noise fashion. For example, if the sending message originates at a fixed station telephone, and the designated receiver is a mobile cellular telephone, the signal from any strong, public broadcasting station can serve as the source of the signal manipulation timing reference provided that both sender and receiver have simultaneous, reliable access to the same broadcast station. Federal radio station WWV, which transmits time signals, could also be used.

Having established that in accordance with the invention the identical, reliable reference signal exists at both the sending and receiving stations, one can proceed to construct a variety of feature extraction means, operating on this reference signal to obtain a timing reference signal for message security purposes. Signal features which can be extracted are for example; instantaneous spectrum as determined by a comb filter, leading to discovery of momentary presence of a specific signal frequency; timing of signal zero crossing; momentary low amplitude (a pause); timing of zero crossing signals after frequency filtering (e.g., low-pass filtering); and combinations subject to arbitrary logic rules of any of the above features. Generally, the feature extraction means used for generating a timing reference signal can be any means that extracts the instantaneous presence of any preselected signal feature, and may include appropriate filtering, amplitude threshold discrimination, clipping and limiting, zero-crossing detection, or time interval discrimination. In this way, specific time-varying, identical signal manipulation keying signals are generated at both the sending and receiving locations. Depending on the nature of the broadcast signal (e.g., voice or music) certain features are more suitable for reliable feature extraction. Furthermore, and to increase the degree of communication security, more than one publicly available broadcast station can be used by both sender and receiver to construct a complex timing device from a variety of features of multiple public signals. Having generated an identical, synchronous timing reference signal at both sending and receiving stations, many types of message security means can be employed to secure the plain text message.

DESCRIPTION OF THE PREFERRED EMBODIMENT

Figure 1:
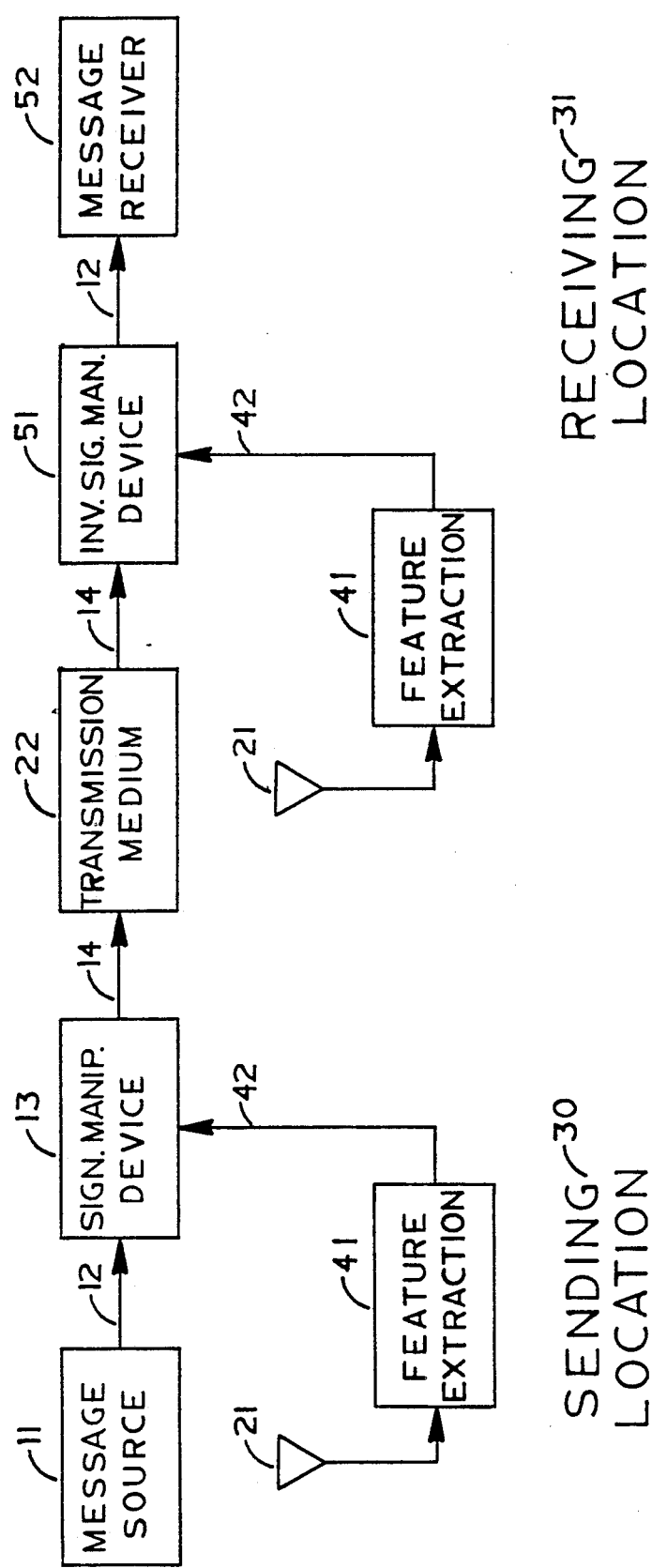
FIG. 1 is a basic block diagram of a secure communication system incorporating the present invention.

Referring to FIG. 1 there is shown a message source 11 feeding signal manipulation device 13. Antenna 21 supplies a public signal at both the sending location 30 and receiving location 31. Both locations employ the identical feature extraction unit 41. The output of said feature extraction unit 41 is the identical signal manipulation time reference signal 42.

At the sending location 30 said signal 42 is employed to convert the plain text message 12 into the cipher message 14 by means of the signal manipulation device 13. Said cipher message 14 goes out over the transmission medium 22 to serve as an input to the inverse signal manipulation device 51. The second input to said device 51 is timing reference signal 42. Finally, the output of said device 51 is the plain text message for the message receiver 52.

Figure 2:
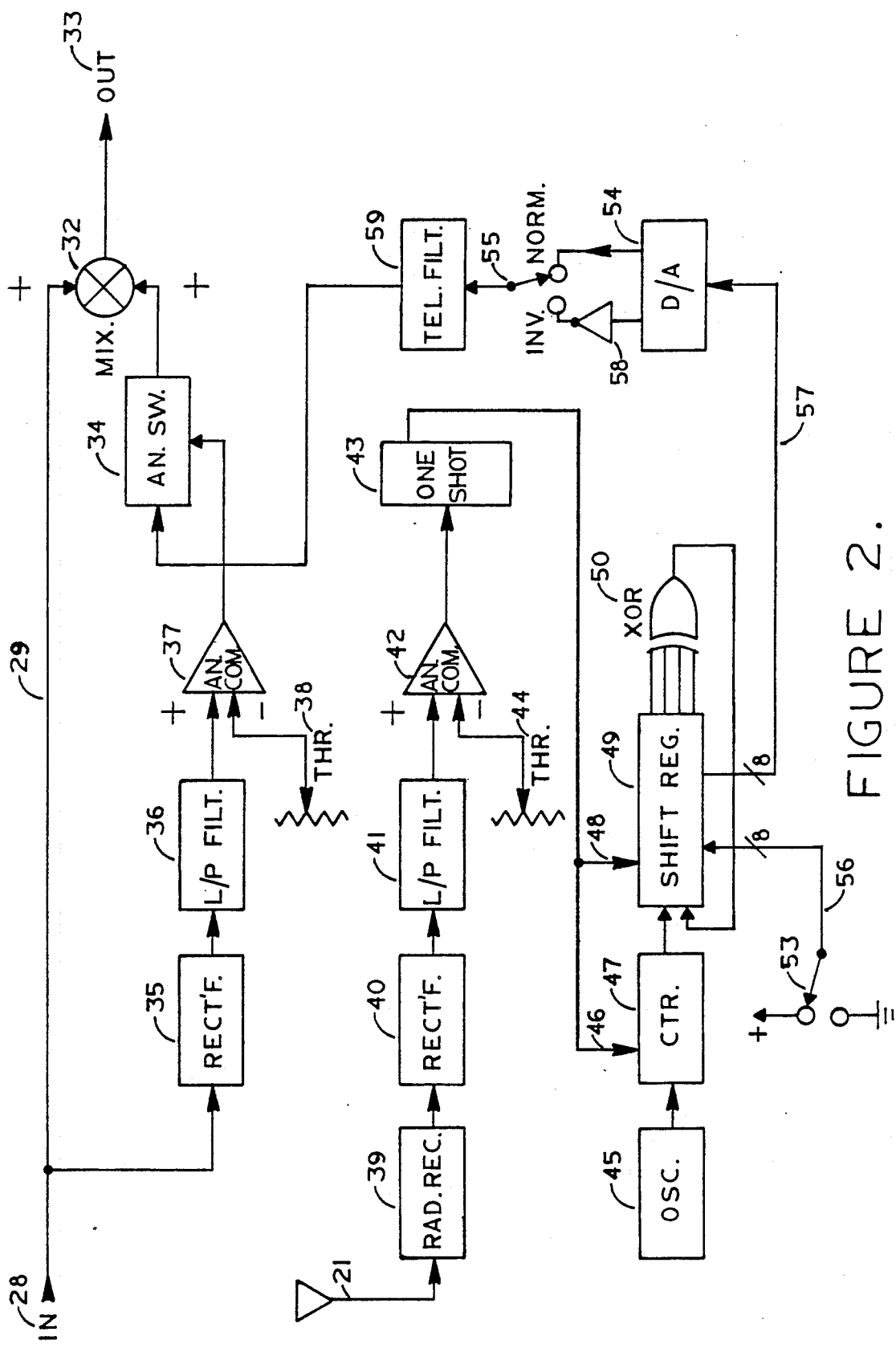
FIG. 2 is a specific diagram of a secure communication system incorporating the preferred embodiment of the invention.

FIG. 2 is a diagram of the preferred embodiment of the invention, using a specific type of feature extraction means and providing message security by noise masking.

The functional feature extraction from the public signal source is accomplished by several units: A conventional radio receiver 39 genrating a conventional audio output from the broadcast signal received by antenna 21; a rectifier 40, such as a simple diode, genrating a unipolar signal; and low-pass filter 41 designed with an attack time constant of 0.3 milliseconds and a decay time constant of 20 milliseconds.

The output of 41 is a unipolar signal roughly following the instantaneous amplitude of the audio signal. In this preferred embodiment receiver 39 is tuned to an all-talk program. Thus, output of 41 clearly delineates the instantaneous presence or absence (pause) of a spoken word. This output signal is fed into an analog voltage comparator 42. THe threshold input 44 is set at slightly above the noise level of the output of 41. Consequently, the output of 42 is a square wave, being "high" during the spoken word, and "low" for a period commencing about 30 milliseconds after the end of each word and ending with the beginning of the next word.

One-shot multivibrator 43 is designed to trigger from the rising edge of the output of 42, and generates a short, 1 μm sec output pulse, to be employed as described below.

Precision free-running oscillator 45 generates a 128 KHz pulse train, fed into the clock input of 256/1 counter 47. The carry output of 47 is a 500 Hz pulse train, connected to the clock input of 8-bit shift register 49. Shift register 49 and X-or-gate 50 are connected as a 255-bit sequence, pseudo-random number sequence generator as described by MacWilliam et al, Proceedings of the IEEE Vol. 64, No. 12, Dec. 1976, pages 1715-1730. Thus, shift register 49 generates a different 8-bit number at its 8 outputs every 2 milliseconds. This will continue for 255 2 millisecond periods, after which it will repeat itself identically.

When one-shot 43 genrates an output pulse, coincident with the beginning of a new word out of radio receiver 39, counter 47 is momentarily cleared to zero at its CLEAR input 46, and shift register 49 is momentarily loaded because of a pulse present at its SHIFT-/LOAD input 48. The exact binary number to be loaded depends on the status of eight data inputs 56, derived from a bank of eight manually settable switches 53. Although the pseudo-random number sequence generated by 49 always repeats identically, the specific starting number for each new word out of the radio reciever 39 can be one of 255 choices, jointly selected by the users as a security key.

The eight-bit parallel output of the shift register 49 is fed via connection 57 to an eight-bit digital-to-analog converter 54. Normal or inverted (by inverter 58) analog signals are available, selectable by switch 55, and filtered by telephony message filter 59.

Thus, there exists a continuous identical pseudo-random noise signal, reset to a specific value with the beginning of each word out of the radio receiver 39.

This noise generation is continuous, and we must note that the circuit of FIG. 2 is identically used at both the sending and receiving locations. At the sending location 30, input 28 corresponds to the plain message 12 of FIG. 1. Output 33 is equivalent to cipher output 14, and switch 55 (FIG. 2) is set to "NORMAL." At the receiving location 31 (FIG. 1), input 28 is equivalent to cipher message 14, output 33 is equivalent to plain message 12 and switch 55 is set to "INVERT."

Referring to FIG. 2, input 28 is fed in parallel to mixer 32, and to rectifier 35, which together with low-pass filter 36 generates an envelope of the spoken message word. Similar to means 42, described above, analog comparator 37 genrates a positive square wave while a signal is present on input 28. The only significant difference between filters 36 and 41 is that in the case of 36 both attack and decay time constants are one and the same at 0.3 milliseconds. While a word is present (output of 37 is HIGH) analog switch 34 is opened and admits a noise burst into mixer 32. At the sending location 30, noise is added to the plain message, and at the receiving location the identical, but inverted noise is mixed in to subtract the same noise and regenerate the plain message. This type of noise cancellation is a well known process, employed in noisy factory locations to make a telephone message easier to understand. It must be emphasized, that the noise cancellation process depends on the availability of the exact, same noise signal at sending and receiving locations. This is a given, because all of the devices 39 through 55 are identical, and the reference signal received by antenna 21 is identical in both locations. Finally, sender and receiver have previously agreed on the same settings on switch bank 53.

Although the above description is for the preferred embodiment of this invention, if a simpler, but less secure transmission mode is acceptable, it is possible to also use the output of analog comparator 37 for the function assigned to the output of analog comparator 42. In that case each spoken work coming from the message source will serve a dual function; (1) It will reset and initiate the burst of noise at is beginning, and (2) cause this noise burst to be mixed with the plain message for security purposes.

At the receiving location, the leading edge of a positive output from analog comparator 37 will reset the receiving location noise generator, in order to generate an identical noise wave shape for subsequent noise cancellation. To summarize, in this simplified version devices 21, 39, 40, 41, 42 and 44 are not used at some sacrifice in security and possibly intelligibility of the message.

Although the present invention has been described in detail with reference to a preferred embodiment, it will be appreciated by those of ordinary skill in the art that various modifications and variations can be incorporated without departing from the invention. Accordingly, the invention is defined only by the following claims.

I claim:

1. In a secure communication system including a message source, a signal manipulation device, a transmission medium comprising a cellular telephone network, an inverse signal manipulation device, and a message receiver, the system further including means for deriving a signal manipulation encryption keying signal from a publicly broadcast radio signal identically available at both devices, the means for deriving being included in both the signal manipulation device and the inverse signal manipulation device.

2. In a secure communication system including a message source, a signal manipulation device, a transmission medium, an inverse signal manipulation device, and a message receiver, the system further including means for deriving a signal manipulation encryption keying signal from another, unrelated, reliably received signal, identically available at both devices, the means for deriving being included in both the signal manipulation device and the inverse signal manipulation device, wherein said unrelated, identically available signal is derived from a conventional broadcast radio signal received at both devices, tuned to the same broadcast source, wherein the transmission medium comprises a cellular telephone network, and wherein the broadcast radio signal consists of spoken words, and pauses between the spoken words are detected such that the end of each pause initiates an identical pseudo-random audio noise sequence at each of the signal manipulation and inverse signal manipulation devices, and during the duration of the word a burst of said audio noise sequence is added to the message source by the signal manipulation device and the identical audio noise sequence is subtracted from received message by the inverse signal manipulation device.

3. A secure voice communication system encrypting a plain text message having spoken words and transmitting the encrypted message from a sending location to a receiving location, the system having a signal manipulation encryption device and an inverse signal manipulation device, both devices including noise generating means, wherein the noise generating means responds to pauses between spoken words such that the end of each pause initiates an identical pseudo-random audio noise sequence at both devices, and for the duration of the message word adds a burst of said audio noise to the plain text message at the sending location, and the identical burst of audio noise is substracted from the encrypted message at the receiving location.

4. A communication system comprising:
   a transmitting station including
      a non-encrypted plain text message,
      signal encryption means for encrypting the plain text message, and
      means for transmitting the encrypted plain text message;
   a receiving station including
      means for receiving the encrypted plain text message transmitted by the tranmitting station, and
      signal decryption means for decrypting the encrypted plain text message to produce a decrypted message corresponding to the plain text message; and
   an unrelated signal source independent of both the transmitting and receiving stations, said unrelated signal source providing a keying signal that is independent of the plain text message and the encrypted plain text message;
   wherein the signal encryption means and the signal decryption means both include
      means for deriving a timing reference signal from the keying signal located at the transmitting station and at the receiving station, and
      means for simultaneously receiving the timing reference signal from the deriving means and using the timing reference signal in synchronizing their encypting and decrypting, respectively.

5. The communication system as recited in claim 9, wherein the deriving means uses a threshold detector in deriving the timing reference signal.

* * * * *